United States Patent
Lynch

(10) Patent No.: US 7,228,818 B2
(45) Date of Patent: Jun. 12, 2007

(54) LITTER DUMP APPARATUS AND METHOD

(76) Inventor: Mary Ann Lynch, 1075 Peachtree Battle Ave., Atlanta, GA (US) 30327

( * ) Notice: Subject to any disclaimer, the term of this patent is extended or adjusted under 35 U.S.C. 154(b) by 0 days.

(21) Appl. No.: 11/435,151

(22) Filed: May 16, 2006

(65) Prior Publication Data

US 2006/0260555 A1    Nov. 23, 2006

Related U.S. Application Data

(60) Provisional application No. 60/683,820, filed on May 23, 2005.

(51) Int. Cl.
*A01K 29/00* (2006.01)
(52) U.S. Cl. .................... 119/168
(58) Field of Classification Search ........... 119/161, 119/165, 168, 61.5, 61.1, 72; 248/146, 150
See application file for complete search history.

(56) References Cited

U.S. PATENT DOCUMENTS

| | | | | |
|---|---|---|---|---|
| 786,557 A | * | 4/1905 | Goede | 119/61.1 |
| 2,691,362 A | * | 10/1954 | Moyer et al. | 119/61.1 |
| 3,990,397 A | * | 11/1976 | Lowe, Jr. | 119/165 |
| 4,090,470 A | * | 5/1978 | Williams | 119/165 |
| 6,295,948 B1 | * | 10/2001 | Bowron | 119/165 |
| 6,378,461 B1 | | 4/2002 | Thaler et al. | 119/166 |
| 6,401,661 B1 | | 6/2002 | Emery | 119/166 |
| 6,588,369 B2 | | 7/2003 | Carlisi | 119/166 |
| 6,848,394 B1 | | 2/2005 | Sexton | 119/170 |
| 6,851,386 B2 | | 2/2005 | Northrop et al. | 119/166 |
| 6,951,190 B2 | | 10/2005 | Northrop et al. | 119/166 |
| 6,997,137 B1 | | 2/2006 | Ricke | 119/168 |
| 7,036,456 B2 | | 5/2006 | Sage, Jr. | 119/166 |

\* cited by examiner

*Primary Examiner*—T. Nguyen
(74) *Attorney, Agent, or Firm*—Thomas, Kayden, Horstemeyer & Risley LLP

(57) ABSTRACT

A litter box assembly has a two piece litter box, each piece having an open end and a support frame in which the open ends are pivotally mounted to each other and to the support frame. Elevating support legs are affixed to the support frame and depend therefrom, the legs being held in fixed rigid position by spacers and braces. The supporting legs form an assembly having an open front, a rear, and two sides, with the open front allowing insertion and withdrawal of a waste or trash container.

13 Claims, 4 Drawing Sheets

LITTER DUMP APPARATUS AND METHOD

CROSS-REFERENCE TO RELATED APPLICATION

This application claims priority to copending U.S. provisional application Ser. No. 60/683,820, filed May 23, 2005, by Mary Ann Lynch, the present inventor, which is entirely incorporated herein by reference.

FIELD OF INVENTION

This invention relates to litter boxes for receiving animal waste, and to methods of cleaning such boxes.

BACKGROUND OF THE INVENTION

In general, litter boxes for use by, for example, cats, comprise an open box like structure which is filled with a litter of granular material. Cats instinctively use such boxes to relieve themselves of their waste, which, over a period of time, becomes odoriferous. Such litter boxes are generally placed within the house or other building and, as a consequence, require periodic cleaning, to abate the odor. Some makers of the litter material incorporate a deodorant therein, which, at least to some extent, retards odor emissions. However, the animal waste must be removed periodically and clean litter material added.

There are numerous ways in which the litter box is cleaned and the litter replenished, the gamut thereof extending from a simple scoop to extremely complex mechanism such as those shown in U.S. Pat. No. 6,378,461B1 of Thaler, U.S. Pat. No. 6,401,661B1 of Emery, and U.S. Pat. No. 6,588,369B2 of Carlisi, as well as numerous others. These complex arrangements are not only apparently too expensive for the ordinary homeowner, but apparently can only be justified where there are large numbers of cats to be accommodated. As a consequence, effort has been directed toward simplification of the litter box cleaning or emptying mechanism. Such mechanisms are generally directed to dumping the contents of the litter box into a waste receptacle while avoiding any contact with the operator's hands, in other words, a reasonably simple and clean method of emptying the litter box is achieved. Such arraignments are shown in U.S. Pat. No. 6,848,394B1 of Sexton and U.S. Pat. No. 6,997,137B1 of Ricke. The Sexton patent is a special interest for its simplicity and ease of use. In the Sexton patent, the litter box sits atop a waste receiving box having a trash bag contained therein. When the litter box is lifted up, the floor thereof, which comprises first and second opposed trap doors, is opened and the waste litter drops into the trash bag. The assembly comprises an outer shell which contains the trash bag and an inner shell which contains the litter and which fits snugly within the outer shell, thereby holding the hinged trap doors of the floor of the inner shell closed. When the inner shell is lifted up from the outer shell, the trap doors have room in which to swing open, and then the litter drops into the trash bag, which is then removed and replaced by a fresh bag. The inner shell is then reinserted into the outer shell, which action closes the trap doors, and fresh litter is then introduced into the inner shell.

In most, if not all of the apparatuses, thus far discussed, one very important consideration appears to have been virtually ignored. In general, the boxes rest upon the floor, thus making it difficult for elderly people or people confined to wheel chairs or otherwise handicapped in such a way that stooping and lifting are difficult and often very painful. In the Ricke patent, the apparatus comprises a cabinet having a litter pan on the top thereof and pivotally mounted at one end to the cabinet. When the end opposite the pivoted end is lifted, an open slot is formed adjacent the pivoted end and the litter is dumped into a trash receptacle in the bottom of the cabinet. Thus, the litter box can be emptied by a person without requiring him or her to stoop or squat in order to clean the box. Because the litter in the Ricke arrangement has some distance to drop, it is necessary to have some sort of guiding arrangement. Further, a certain amount of dirty litter is likely, over time, to fall into the cabinet. The cabinet itself is a piece of furniture and apparently is unusually heavy. Further, the floor of the litter box adjacent its pivot end fits snugly against the inner wall of the cabinet. Thus a certain amount of precision is required to prevent a small gap from spilling litter. On the other hand, the Ricke patent has an elevated litter box, which enables those people having various handicaps, as pointed out before, to empty the litter box without having to bend over, stoop, or lift a heavy box.

What is apparently missing in the prior art is a lightweight, simple but efficient elevated litter box structure, that can be moved to different locations, and that can be broken into component parts when not needed and readily re-assembled when subsequently needed, and wherein the litter box itself is supported by a lightweight structure.

SUMMARY OF THE INVENTION

The present invention is a lightweight litter box assembly wherein the litter box itself is elevated to a height that is convenient for virtually all users whether handicapped or not.

The assembly comprises a support frame of open rectangular shape and composed of, for example, hollow aluminum members, each of rectangular shape which are joined at their ends to form the open rectangular support structure. The litter box itself is formed by two members, preferably of rigid plastic material, each configured to form one half of a box and having overlapping open ends which are pivotally mounted to an inner wall of the support structure. When so mounted, the two members form an open litter box which fits into the open support structure and are prevented from falling therethrough by flanges extending along their upper edges which rest upon the upper surface of the support structure.

The support structure itself is elevated and supported by support legs affixed at each corner thereof. The support legs are made from a lightweight material such as a rigid plastic or aluminum. In order to ensure rigidity to the entire assembly, the support legs are maintained in fixed spaced relationship by spacer members affixed to the lower ends of the support legs. Further rigidity is added to the structure by diagonal bracing straps affixed to the front pair of support legs at their lower ends and to the rear pair of support legs at their upper ends. In addition, the rear pair of support legs are cross-braced by a pair of bracing straps, one of which is affixed to the lower end of a first rear support leg and extends to and is affixed to the upper end of the second rear support leg. In like manner, a bracing strap extends from and is affixed to said second rear support leg at the lower end thereof and extends to and is affixed to the upper end of the fist rear support leg. The two straps are affixed to each other at their crossing point. First and second rail members extend from the front spacer member to the rear spacer member and are affixed thereto. The said rail members function as supports for a waste receptacle which can be slid into and out of the structure along the rail members.

The complete assembly as described in the foregoing can be, and preferably is, made of a rigid plastic material or lightweight metal, such as aluminum. The assembly can be readily put together from the several component parts inasmuch as bolts and nuts are preferably used to affix the parts to each other and all such parts have holes therein for receiving the bolts. The resultant assembly constitutes a lightweight rigid, elevated litter box which withstands a cat jumping into the box without any movement thereof which might frighten the cat. Further, the litter box can be easily emptied by merely lifting the ends of the two litter box members and thus forming a gap therebetween through which the litter to be replaced falls down into the receptacle. The assembled parts may be easily disassembled for relocation or shipment and can, if desired, form a kit for assembly by the owner or user.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
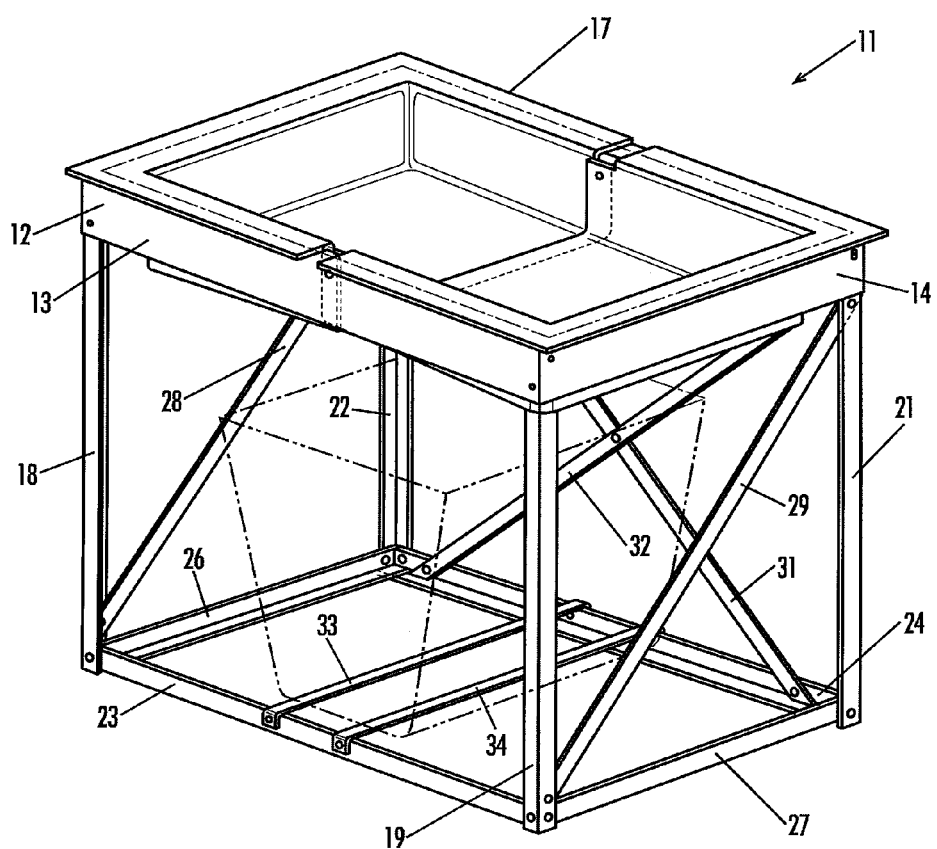
FIG. 1 is a perspective view of a preferred embodiment of the invention.

In FIG. 1 there is shown, in perspective, a preferred embodiment of the present invention, which comprises an elevated litter box assembly 11.

Litter box assembly 11 comprises a support frame 12, having front 13, side 14, and rear 16 (not shown) members of, for example, hollow rectangular aluminum tubing joined at the four corners by suitable means to form an open rectangular support frame. The material of the support frame may be, instead of aluminum, made of a rigid hollow rectangular plastic tubing, or even a light wood. The primary consideration being that support frame 12 be both light in weight and strong enough to support a loaded litter box 17, which will be described more fully hereinafter.

Affixed to support frame 12 at the four corners are support legs 18, 19, 21, and 22, which may be of suitable length such as seventeen to twenty inches, for example, to support frame 12 in an elevated position. As shown in FIG. 1, the legs preferably are made from L-angled aluminum rods, which facilitates affixing the legs to the support frame and other locating and bracing members. It is to be understood that the specified aluminum material is only one of several possible rigid, lightweight materials such as plastic, or even, light wood. For convenience of description, legs 18 and 19 form an open front of the assembly while legs 21 and 22 form the rear of the assembly and legs 18 and 22 are held in fixed spaced relationship by spacer members 23 and 24, respectively, which are affixed to the bottom or distal ends of the support legs, as shown. In like manner, legs 18 and 22 and legs 19 and 21 are held in fixed spaced relationship by spacer members 26 and 27, respectively. Spacer members 23, 24, 26, and 27 are preferably made of the same L-shaped material as legs 18, 19, 21, and 22, i.e., lightweight aluminum, however, other rigid and lightweight materials may be used, as pointed out heretofore. One of the advantages of lightweight aluminum is that the several components may be affixed to each other by bolts and nuts, as shown, although not otherwise described. A nut-bolt arrangement permits relatively easy assembly and disassembly, which facilitates moving or transporting the litter box arrangement. From a commercial standpoint, the entire litter box arrangement can be produced and contained in a disassembled state, and sold in kit form for assembly by the purchaser.

As thus far described, the arrangement constitutes a litter box 17 supported in an elevated position by a rigid framework of support legs and spacer members. Such a structure produces a stable supporting platform for the litter box, however, if a cat jumps into the litter box and the assembly is thereby caused to rock or otherwise move, it will frighten the cat and, in all probability, it will thereafter avoid the litter box. In order that such movement of the litter box be avoided, further bracing for the support structure of FIG. 1 is included therein. Such bracing may include rigid strap members 28 and 29 of suitable material such as aluminum, plastic or other rigid but lightweight material. Straps 28 and 29 are affixed, as by bolts, to the upper ends of legs 22 and 21, respectively, and to the lower ends of legs 18 and 19, respectively. In addition, a strap member 31 is affixed to spacer member 24 at the end thereof adjacent the distal end of the leg 21 and to the upper end of leg 22, and a second strap member 32 is affixed to the end of spacer member 24 adjacent the distal end of leg 22 and to the upper end of leg 21. Thus, the straps 31 and 32 form diagonal bracing members which cross each other as shown in FIG. 1 For added rigidity of the structure, straps 31 and 32 are affixed to each other at the crossing point, as shown.

The assembly 11 also includes spaced support rails 33 and 34 which extend from spacer member 23 to spacer member 24 and are affixed thereto. The support rails form a platform for a waste receptacle, shown in dash-dot outline, which can be inserted through the open front of the assembly or, when full, removed therefrom. Although the support rails are shown as flat straps extending across the bottom of the assembly, they may be elevated by suitable means, not shown, to place the top of the waste receptacle, which may contain a trash bag, closer to the underside of litter box 17.

It is to be understood that the embodiment of the invention shown in FIG. 1, although preferred, especially for its ease of assembly and disassembly, is only one of a number of embodiments which may be constructed with observance of the principles of the invention.

Figure 2:
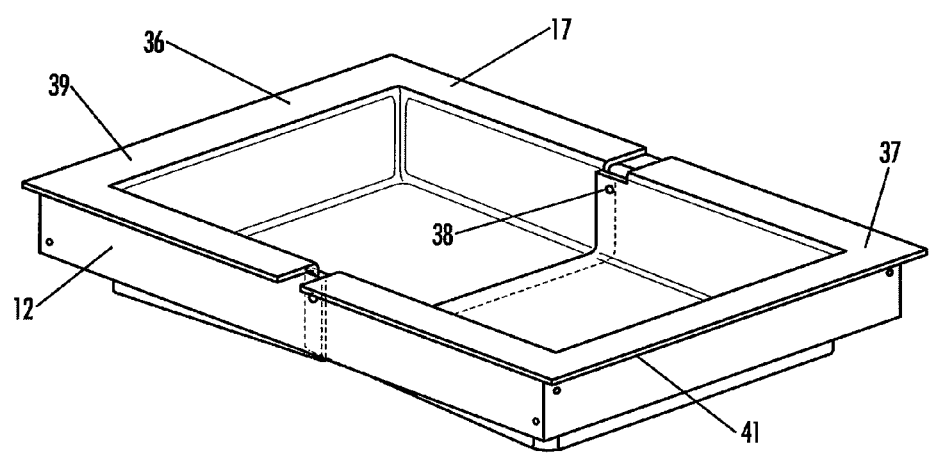
FIG. 2 is a perspective view of the litter box of the invention.

FIG. 2 depicts the litter box 17 mounted in the support frame 12, the litter box comprising first and second half members 36 and 37 which are pivotally mounted to frame 12 by pivot pins 38, only one of which is shown. The upper edge of the member 36 has extending therefrom a flange 39, and the upper edge of the member 37 has extending therefrom a flange 41. When the two halves 36 and 37 are joined at the pivot points, the flanges 39 and 41 function to support the litter box 17 in the support frame 12.

Figure 3:
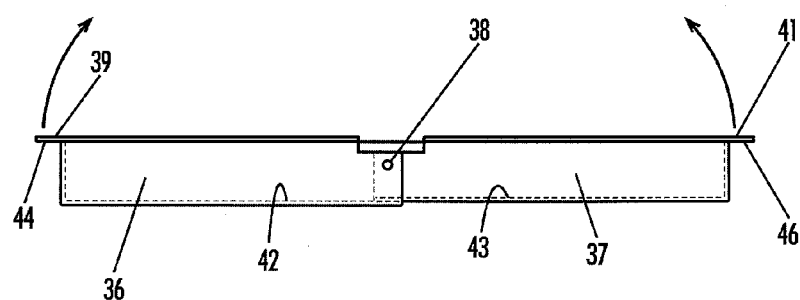
FIG. 3 is a side elevation view of the litter box of the invention.
Figure 4:
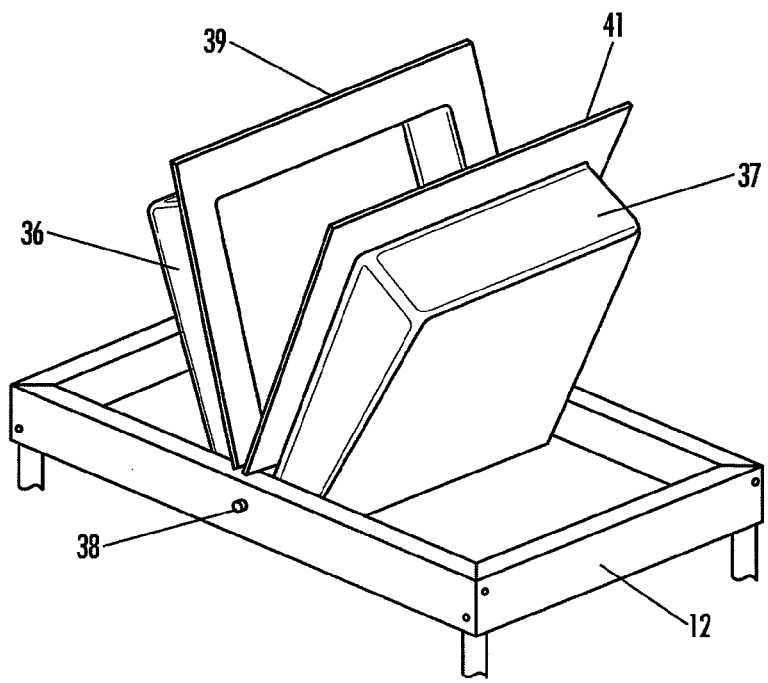
FIG. 4 is a perspective view of the litter box of the invention in its waste removal configuration.
Figure 5:
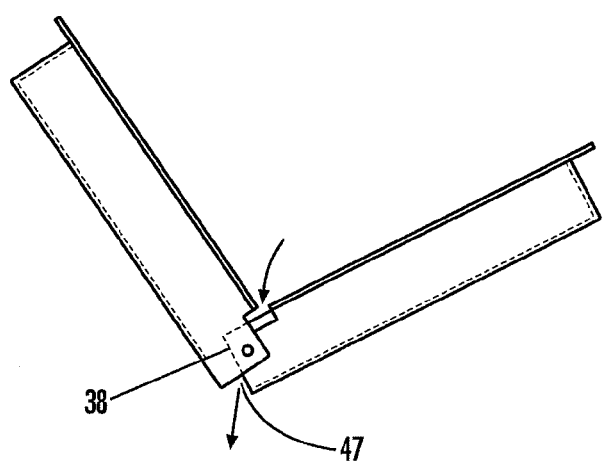
FIG. 5 is a detail of the configuration shown in FIG. 4.

FIG. 3 is a side elevation view of the two halves 36 and 37 of liter box 17 as joined together. It can be seen that the floor 42, shown in dashed lines of box half 36 extend beyond the pivot point 38 and under the floor 43 of box half 37 to form a support therefor. In use, with the litter box 17 assembled and resting on support frame 12, this extension of the floor 42 of member 36 prevents the two halves 36 and 37 from an inadvertent pivoting about pivot point 38. On the other hand, when the ends 44 and 46 of flanges 39 and 41, respectively, are lifted in the direction of the arrows in FIG. 3, as shown in FIG. 4, a gap 47 is formed as indicated in the detail of FIG. 5 through which the waste litter material passes as indicated by the arrows into the waste receptacle. Thus a mere lifting of the two ends 44 and 46 is all that is required.

Figure 6:
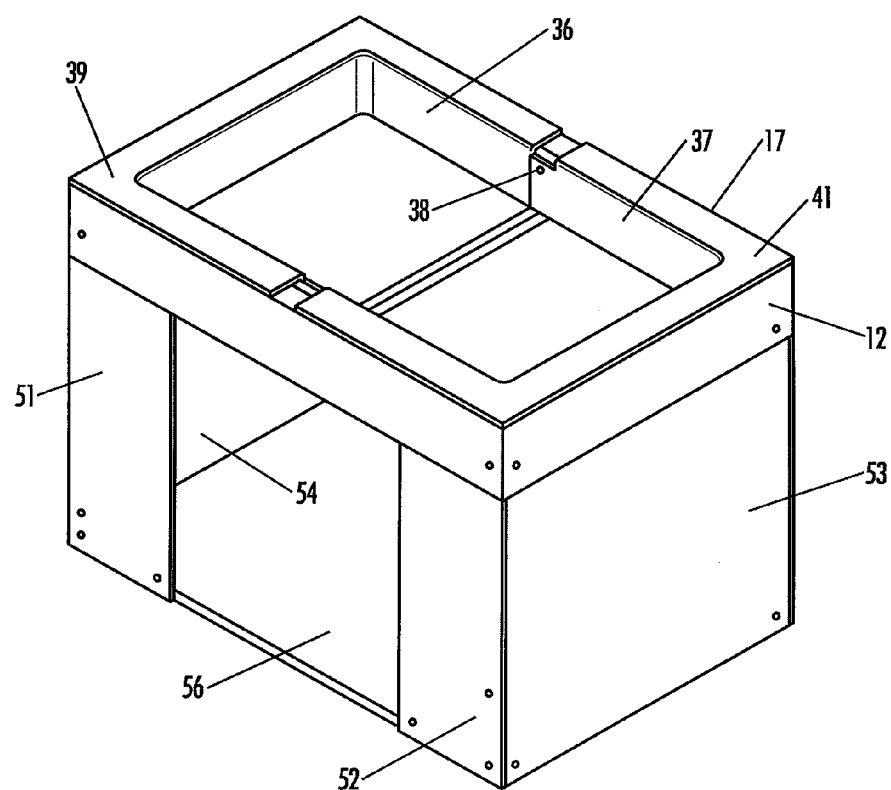
FIG. 6 is a perspective view of another embodiment of the invention.

FIG. 6 is a perspective view of a second embodiment of the invention wherein the several bracing and spacing members of FIG. 1 are replaced by a plurality of stiff but light weight panels 51, 52, 53, 54 as shown, and a rear panel (not shown). The panels which may be of rigid plastic or light weight plywood for example, form substantially the same spacing and bracing functions as the members shown in FIG. 1. In addition, further bracing can be supplied by a floor 56 which bears the waste receptacle shown in FIG. 1. The panels are mounted in the same manner as the several members in FIG. 1 by bolts and nuts, or screws where appropriate. As is the case with the embodiment of FIG. 1, the assembly may be quickly and easily disassembled for storage or transporting.

As pointed out in the foregoing, the litter box assembly may be disassembled and subsequently re-assembled.

Re-assembly comprises attaching the supporting legs to the support frame, affixing the spacers and braces (or the panels) in place, inserting the two pieces of the litter box into the opening in the support frame, and pivoting the two pieces together adjacent their open ends and also pivoting them to the support member, all in such manner that the floors of the two pieces overlap each other at their open ends.

It is to be understood that the foregoing has been for purposes of illustrating the principles and features of the present invention. It is possible and to be expected that variations or modifications to the embodiments herein shown without departure from the spirit and scope of the present invention.

The invention claimed is:

1. A litter box assembly comprising:
   a support frame having a central opening therein;
   said support frame being elevated and supported by a plurality of legs depending therefrom, said legs having proximal ends affixed to said support frame and digital ends;
   a litter box comprising a first open ended receptacle configured to fit within said central opening, said first receptacle having an open end, a floor and first and second side walls and an end wall remote and opposite from the open end, and a second open ended receptacle configured to fit within said central opening, said second receptacle having an open end, a floor and third and fourth side walls and an end wall remote and opposite from the open end;
   said first and second receptacles being rotatably pivoted to each other adjacent their open ends and to the support frame, with the floor of one of said receptacles overlapping the floor of the other; and
   each of said receptacles having flanges extending from the top of said walls, adapted to bearing against said frame when said litter box is in said frame opening.

2. A litter box assembly as claimed in claim 1 wherein said legs form a substantially rectangular support structure having an open front side and a rear side and first and second ends.

3. A litter box assembly as claimed in claim 2 wherein the legs forming said rear side and said first and second ends are held in fixed, spaced relationship by spacer members.

4. A litter box assembly as claimed in claim 3 wherein said spacer member comprise light weight rods.

5. A litter box assembly as claimed in claim 4 wherein said rods are L-shaped.

6. A litter box assembly as claimed in claim 4 wherein said rods re made of aluminum.

7. A litter box assembly as claimed in claim 4 wherein said rods are made of plastic.

8. A litter box assembly as claimed in claim 3 wherein said spacer members are made of wood.

9. A litter box assembly as claimed in claim 3 wherein said spacer members are made of plastic.

10. A litter box assembly as claimed in claim 3 wherein said spacer members comprise panels affixed to said legs.

11. A litter box assembly as claimed in claim 10 wherein said panels comprise plastic material.

12. A litter box assembly as claimed in claim 10 wherein said panels comprise light weight wood material.

13. A litter box assembly as claimed in claim 12 wherein said wood material is light weight plywood.

\* \* \* \* \*